United States Patent
Adams

(10) Patent No.: US 8,950,565 B2
(45) Date of Patent: Feb. 10, 2015

(54) ANTI BACK-DRIVE COUPLINGS

(75) Inventor: David Leslie Adams, Bath (GB)

(73) Assignee: Rotork Controls Limited, Bath, Avon (GB)

(*) Notice: Subject to any disclaimer, the term of this patent is extended or adjusted under 35 U.S.C. 154(b) by 0 days.

(21) Appl. No.: 13/805,868

(22) PCT Filed: Jun. 22, 2010

(86) PCT No.: PCT/GB2010/051032
§ 371 (c)(1),
(2), (4) Date: Jan. 22, 2013

(87) PCT Pub. No.: WO2011/161394
PCT Pub. Date: Dec. 29, 2011

(65) Prior Publication Data
US 2013/0206530 A1    Aug. 15, 2013

(51) Int. Cl.
*F16D 41/10*    (2006.01)

(52) U.S. Cl.
CPC .............. *F16D 41/10* (2013.01); *F16D 41/105* (2013.01)
USPC ..................... 192/223.2; 192/44; 192/45.006; 192/12 B

(58) Field of Classification Search
CPC ............................... F16D 41/10; F16D 41/105
USPC ................................ 192/232.2, 45.006, 12 B
See application file for complete search history.

(56) References Cited

U.S. PATENT DOCUMENTS

| | | | | |
|---|---|---|---|---|
| 1,292,099 | A | * | 1/1919 | Seymour ...................... 192/12 B |
| 3,283,611 | A | * | 11/1966 | Weismann et al. ............. 74/650 |
| 3,584,713 | A | * | 6/1971 | Tani et al. ........................ 192/38 |
| 2003/0178237 | A1 | * | 9/2003 | Terada .......................... 180/249 |

FOREIGN PATENT DOCUMENTS

| | | |
|---|---|---|
| EP | 0999375 A1 | 5/2000 |
| EP | 1239178 A2 | 9/2002 |
| WO | WO2010/004880 * | 1/2010 |

OTHER PUBLICATIONS

Machine language translation of WO 2010/004880.*

* cited by examiner

*Primary Examiner* — Ramya Burgess
*Assistant Examiner* — Mark Manley
(74) *Attorney, Agent, or Firm* — King & Schickli, PLLC

(57) ABSTRACT

An anti back-drive coupling (5) comprises an input (20) driveable about an axis A in a clockwise and anticlockwise direction in torque transmitting communication, via a mechanism, with an output (40) driveable about the axis by the input in either of the rotational directions, the mechanism including: a tube (29), driveable by the input, carrying two cages (21) and (23) spaced along the axis A, each cage housing rollers (26) and (28) respectively; an output member 48 for driving the output (40), including two flattened formations (42) and (44) adjacent each cage in use, for engagement with the rollers (26) and (28) respectively; and a back-torque reaction freewheels (30) and (32) engageable with the rollers, for reacting back-torque transmitted through said output member (48) and into the rollers.

17 Claims, 6 Drawing Sheets

ANTI BACK-DRIVE COUPLINGS

FIELD OF THE INVENTION

This invention relates to an anti back-drive coupling which enables torque to be transmitted from an input to an output in clockwise or anticlockwise rotation directions but restrains or prevents the output from transmitting back-torque from the output to the input in both rotation directions.

BACKGROUND OF THE INVENTION

Drives such as a worm gear and worm wheel pair allow torque to be transmitted only from an input shaft connected to the worm gear, and into an output shaft connected to the worm wheel. If the helix angle of the worm gear teeth is shallow, then no back driving is possible. However, such drives have high friction loses, are expensive to produce, and are not compact. In addition the low gear ratio provided by that drive is often not required.

SUMMARY OF THE INVENTION

The present invention provides an anti back-drive coupling comprising an input driveable about an axis in a clockwise and anticlockwise direction in torque transmitting communication, via a mechanism, with an output driveable about the axis by the input in either of the rotational directions, the mechanism including: a tube, driveable by the input, carrying two cages spaced along the axis, each cage housing at least one bearing element; an output member for driving the output, including at least one engagement portion adjacent each cage for engagement with the or each bearing element housed in each cage; and a torque reaction member engageable with the or each bearing element, for reacting back-torque transmitted through said output member and into the or each bearing element.

In an embodiment, the output member is radially inward of the cages, and said reaction member is radially outward of the cages.

In an embodiment, said reaction member includes a pair of freewheels allowing rotation in one of the directions only, and arranged in opposition adjacent each cage such that one of the pair prevents or restrains clockwise rotation, and the other prevents or restrains anticlockwise rotation, in each case as a result of back torque.

In an embodiment, said at least one bearing element is a plurality of bearing elements and each cage is formed by a plurality of circumferentially spaced apertures in the tube, open on radially inner and outer surfaces of the tube, each aperture for housing one of said plurality of bearing elements.

The apertures of a first of the two cages may be offset circumferentially from the apertures of a second of the two cages.

The at least one engagement portion of the output member may comprise a plurality of flats or flattened portions adjacent the first cage and a plurality of flats adjacent the second cage, each plurality of flats corresponding in number and position to the plurality of apertures in the first and second cages.

In an embodiment, the apertures in each cage are generally equispaced, and the plurality of flats form a generally polygonal first and second formations adjacent the first and second cages respectively.

In an embodiment, the apertures of the first and second cages and the flats of the first and second polygonal formations have a circumferential pitch of n degrees and the circumferential offset between the first and second apertures is less than n and preferably less than ½ n.

In an embodiment, when the input is driven clockwise, the bearing elements in the first cage are driven by the input via the first cage into engement with the flats of the first polygonal formation while the bearing elements in the second cage are loosely held, and when the input is driven anticlockwise, the bearing elements in the second cage are driven by the input via the second cage into engagement with the flats of the second polygonal formation while the bearing elements in the first cage are loosely held.

In an embodiment the bearing elements in the first cage when being driven clockwise, engage also with a first of the two freewheels and said first freewheel allows only clockwise rotation of the first cage and associated bearings elements in the first cage engage, and the bearing elements in the second cage when being driven anticlockwise, engage also with a second of the two freewheels associated and said second freewheel allows only anticlockwise rotation of the second cage and associated bearing elements in the first cage engage.

Thus, when back-torque is applied to the output member in the anticlockwise sense, the first polygonal formation engages with associated bearing elements and in turn these engage with the first freewheel which restrains or prevents anticlockwise rotation, and when torque is applied to the output member in the clockwise sense, the second polygonal formation engages with associated bearing elements and in turn these engage with the second freewheel which restrains or prevents clockwise rotation.

In an embodiment the ratio of rotational speed of the input relative to the output is 1:1.

Each of the two cages may include a respective elongate aperture, in use, the at least one bearing member being at least partially housed in one of the apertures. Lengths of the elongate apertures are greater than a length of the at least one bearing member.

The invention extends to any feature, or any combination of features described herein, whether or not that combination is explicitly described herein.

BRIEF DESCRIPTION OF THE DRAWING FIGURES

The invention can be put into effect in numerous ways, one example only being described and illustrated with reference to the drawings, wherein.

DETAILED DESCRIPTION OF THE INVENTION

Figure 1:
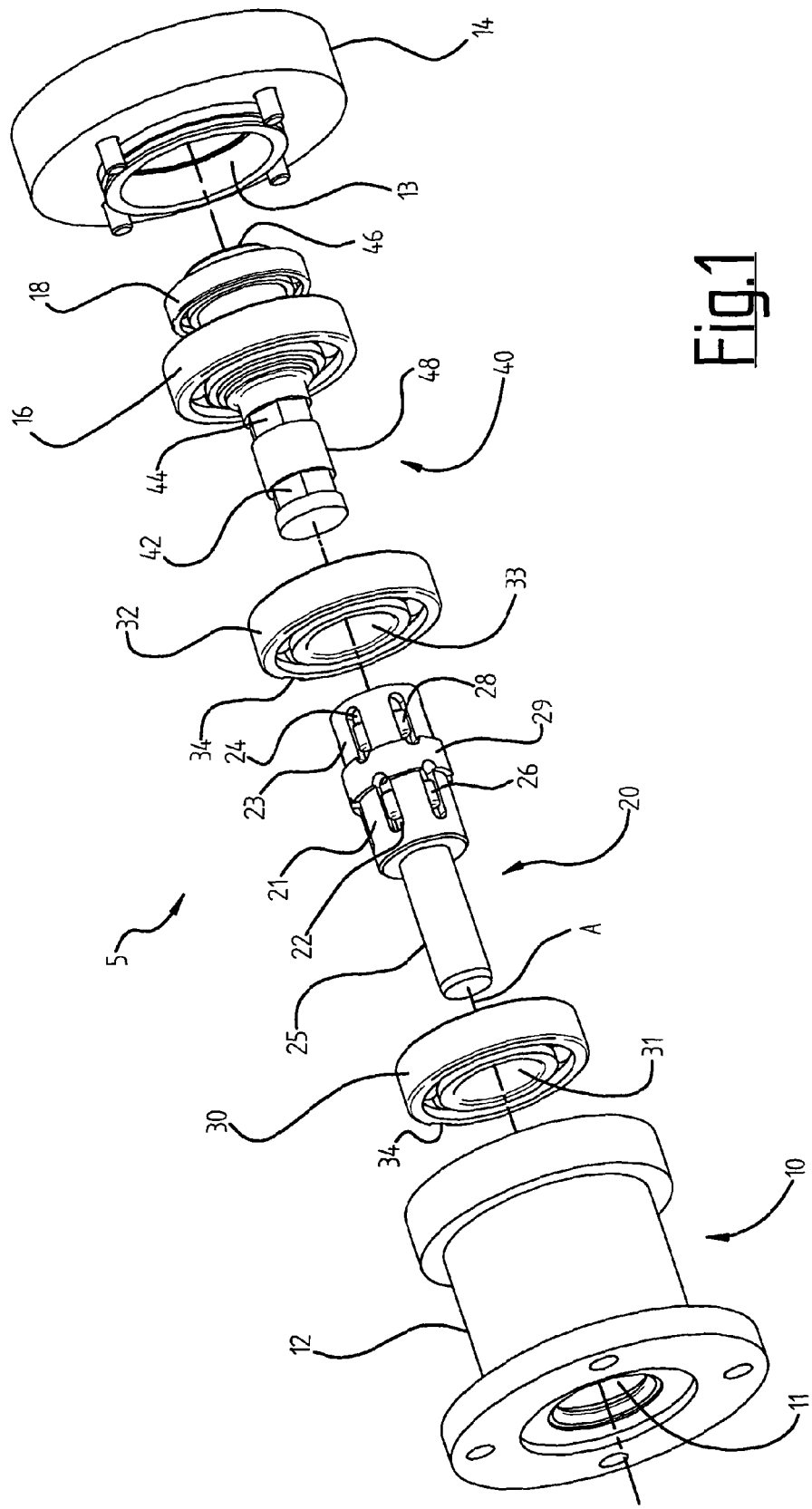
FIG. 1 shows an exploded view of an anti back-drive coupling.

Referring to FIG. 1 there is shown an exploded view of an anti-back drive coupling 5. The coupling 5 includes a static housing 10 comprising two parts—a body 12 for housing the remaining parts of the coupling and a base 14 for securing to a torque reacting member (not shown) such as a machine frame.

The coupling 10 further includes an input shown generally at reference 20 and an output shown generally at reference 40 and a mechanism, described below, connecting the input and output. The mechanism includes an input shaft 25, which in use projects through an aperture 11 in the body 12 of the housing 10 and a socket 46, which when assembled in generally flush with the outer face of an output aperture 13 in the base 14. The mechanism further includes a tube 29 in torque transmitting communication with the input shaft 25. The tube 29 has two cages 21 and 23 spaced axially. The cages include a series of circumferentially spaced apertures 22 and 24, only one aperture in each series being referenced in the drawing. These apertures extend from a radially inner surface of the tube 29 to a radially outer surface of the tube. The apertures 22 and 24 house bearing elements in the form of rollers 26 and 28, respectively. The input 20 is supported for rotation about an axis A by two freewheel units 30 and 32 which are a sliding fit over the radially outer surface of the tube 29 and are located, when assembled, radially outwardly of the cages 21 and 23. The freewheel units may comprise sprag clutches or another type of freewheel. When assembled, the rollers 26 and 28 can selectively avoid or interfere with the circumferential inner surfaces 31 and 33 of the freewheel units 30 and 32.

The freewheel units 30 and 32, when assembled, fit within the body 12 and include slots 34 which prevent rotation of their outer members in the body 12.

The output 40 includes a shaft 48 which sits substantially within the tube 29. The shaft 48 includes two areas 42 and 44 having engagement portions, in this case formed into flats of a polygon. In this instance the polygon is a hexagon. These two polygons 42 and 44 are axially spaced, and, when assembled, are located radially inwardly of the two cages 21 and 23. The relative sizes of the polygons 42 and 44 in relation to the cages 21 and 23, and the rollers 26 and 28, mean that relative of rotation between the input 20 and output 40 is restricted because the polygons 42 and 44 force the rollers 26 and 28 outwardly to interfere with the inner faces 31 and 33 of the freewheels 30 and 32, after a limited amount of relative rotation between the input 20 and the output 40. When assembled, the ends of the rollers 26 and 28 abut the portions of the shaft 48 upstanding at the ends of the respective polygons 42 and 44. The rollers 26 and 28 are axially located by the width of the flats on the output shaft 48. This enables the apertures 22 and 24 of the input tube 29 to be longer than the length of rollers to the extent that the apertures extend beyond the width of the freewheels to enable a path for lubricant, e.g. oil, flow. This arrangement also means that the ends of the rollers cannot come into contact with the ends of the apertures, which could lead to a roller 'climbing' the wall of the aperture and possibly jamming diagonally whilst the roller is being loosely held. The output 40 is supported in rotation about the axis A by two bearing assemblies 16 and 18. The bearing assembly 16 lies within the body 12 when unassembled, and the assembly 18 sits in the base 14 when assembled.

In alternatively embodiments, the arrangement may be substantially reversed; for instance, with the shaft 48 being located radially outward of the cages 21 and 23 and the freewheel units 30 and 32 located radially inward of the cages.

Figure 2:
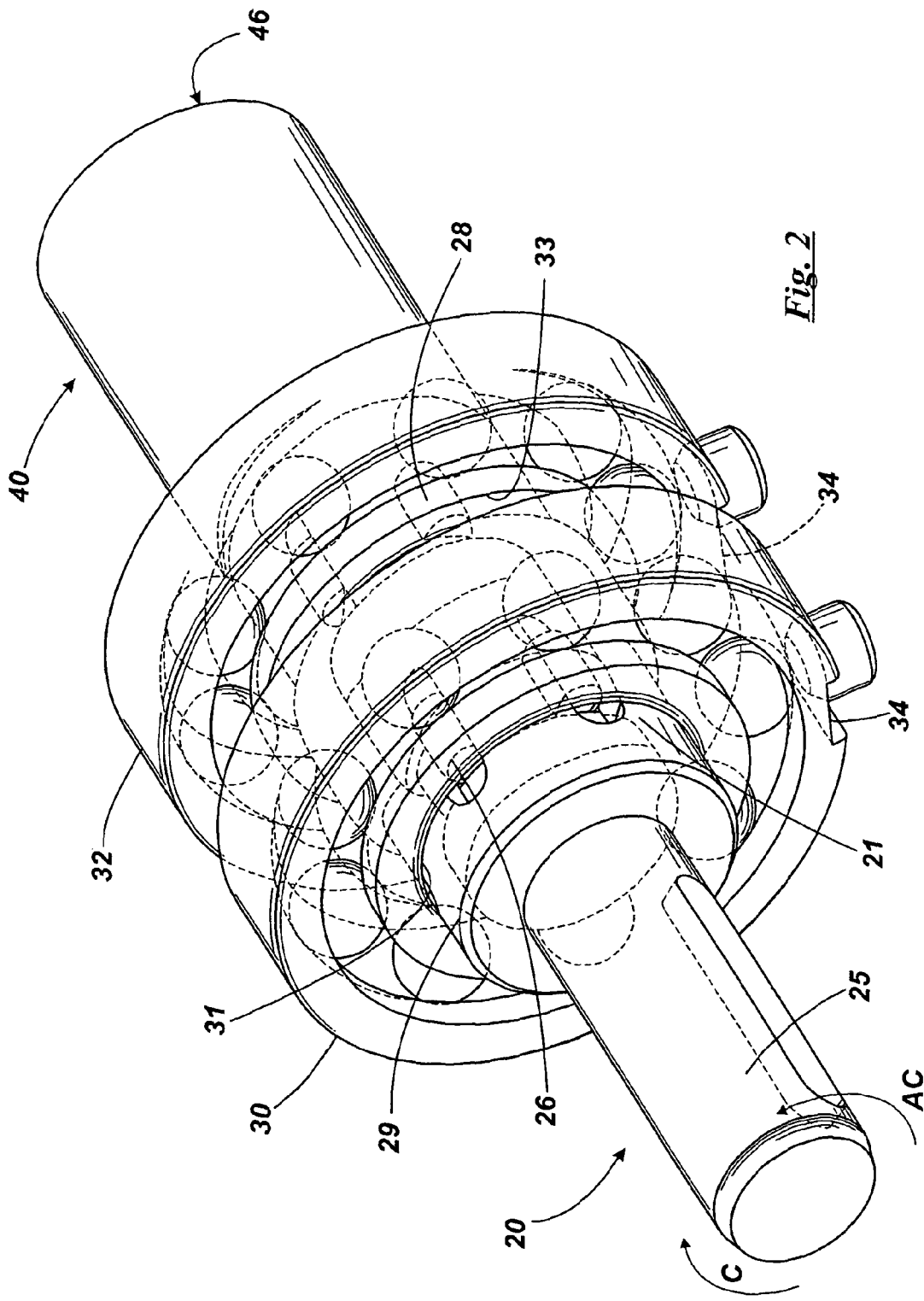
FIG. 2 shows an assembled, semi transparent perspective view of some of the parts of the coupling shown in FIG. 1.

FIG. 2 shows the input 20, the output 40 and the two freewheels 30 and 32 in an assembled condition, as well as the cages etc which form the mechanism connecting the input to the output. The illustrations show the relevant detail of the components in transparent form, although in practice they will not be transparent. In particular, it can be seen that the inner surfaces 31 and 33 of the respective freewheels sit snugly around the tube 29 providing a sliding fit. The rollers 28 and 26 are captured within their respective cages and engage with the polygons 42 and 44 shown in FIG. 1 and with the inner faces 31 and 33. With its outer race fixed, the inner race of the freewheel 30 can rotate only in the direction indicated by arrow C. Freewheel 32 is oppositely orientated such that its inner race can only rotate in the direction of arrow AC.

Figure 3:
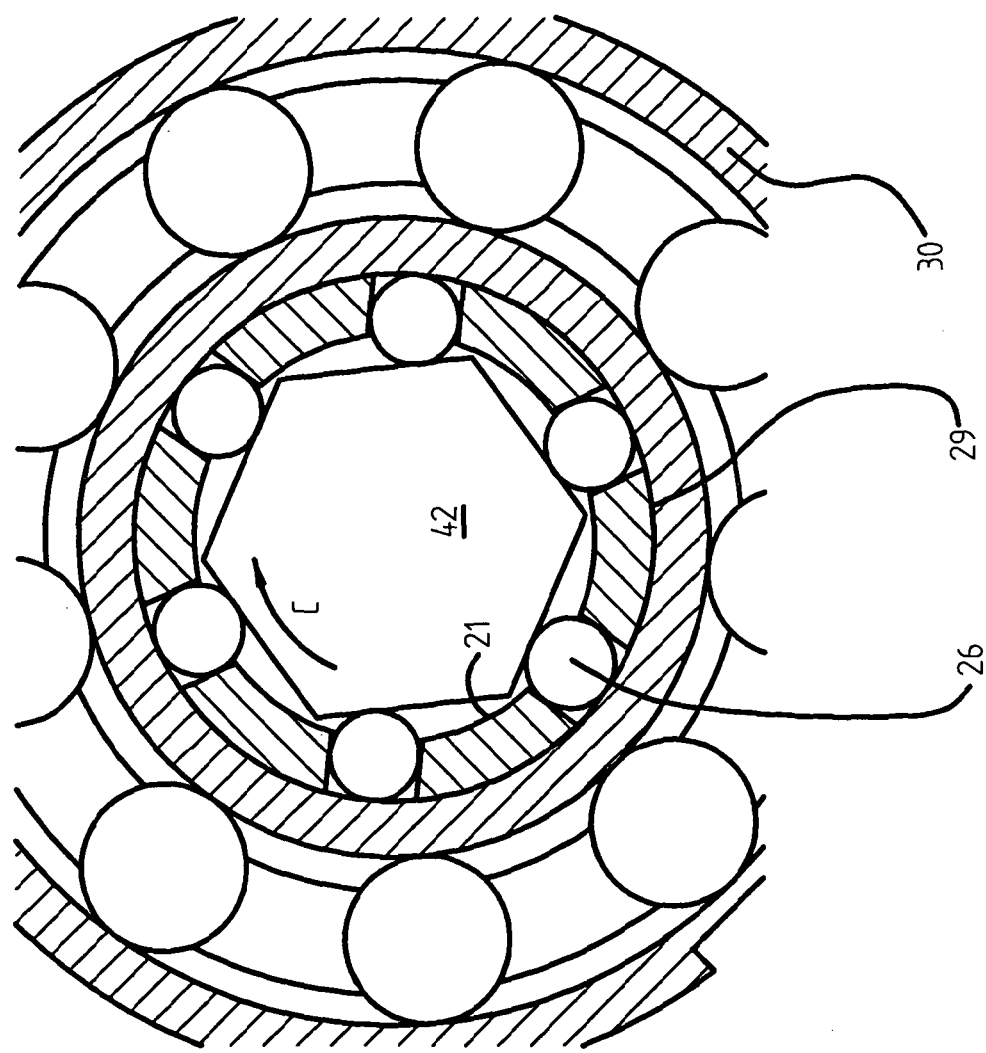
FIGS. 3 to 6 show sections through the assembly of FIG. 2, with different orientations of parts.

Referring additionally to FIG. 3, this drawing shows a partial section through the cage 21 shown in FIG. 2. In this drawing, the cage 21 is being driven in the clockwise direction C. This motion causes the rollers 26 to be forced by the cage 21 onto the flats of the polygon 42. The inner race of the freewheel 30 is permitted to rotate in the clockwise direction C and so torque is transmitted via the cage 21 into the rollers 26 and into the flats on polygon 42 and in turn to the output 40.

Figure 4:
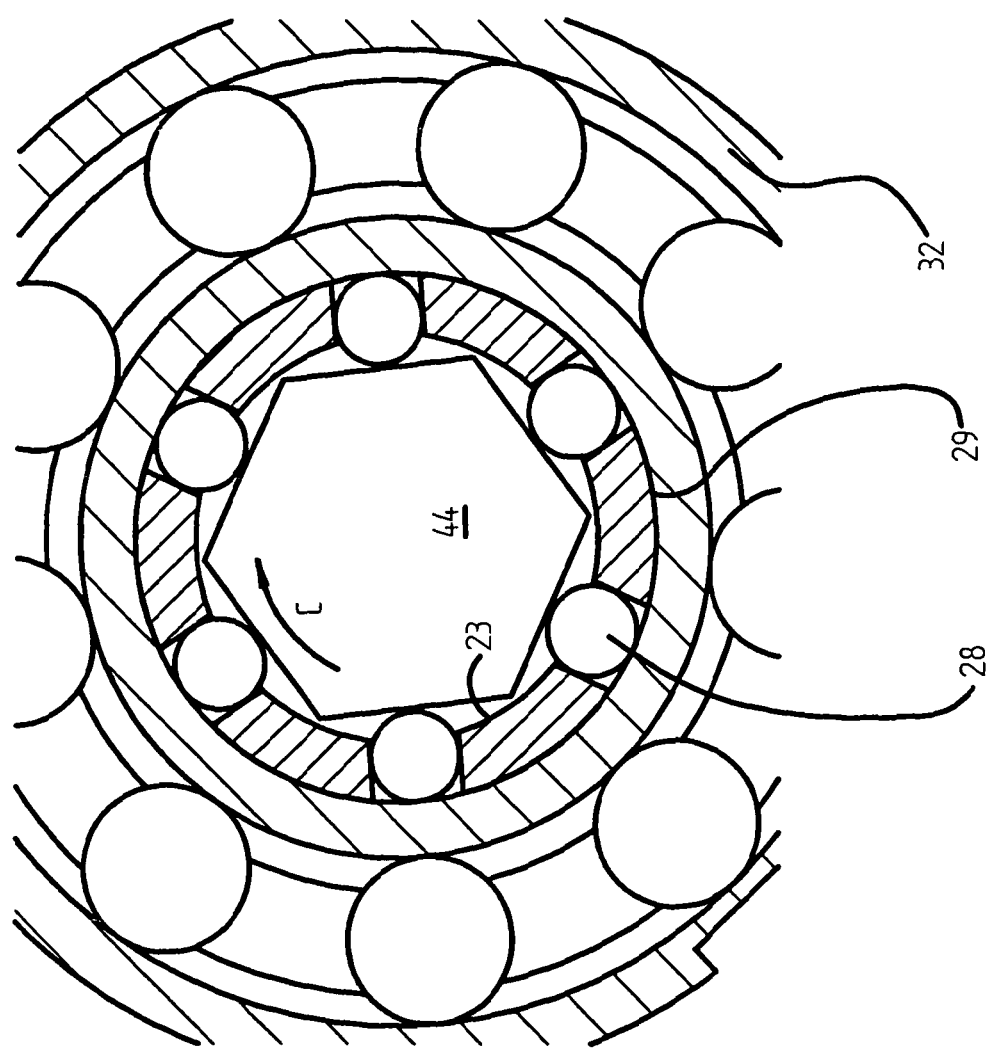

FIG. 4 shows the orientation of parts at the second freewheel 32, when the first freewheel 30 is as shown in FIG. 3. In FIG. 4 the rollers 28 are a loose fit with respect to the flats on polygon 44 and so the rollers 28 do not engage with the inner race of the freewheel 32. Therefore, there is no influence from the rollers 28 when the arrangement of rollers 26 is as shown in FIG. 3. The rollers 28 obtain their position shown in FIG. 4 by virtue of the fact that the apertures 22 and 24 in their respective cages are offset circumferentially by an angle n. This angle is preferably around 10°, where the separation angle between the rollers is 60° to coincide with the hexagonal polygons illustrated. In other arrangements the offset can be greater or less and will typically be less than about ½ n.

Figure 5:
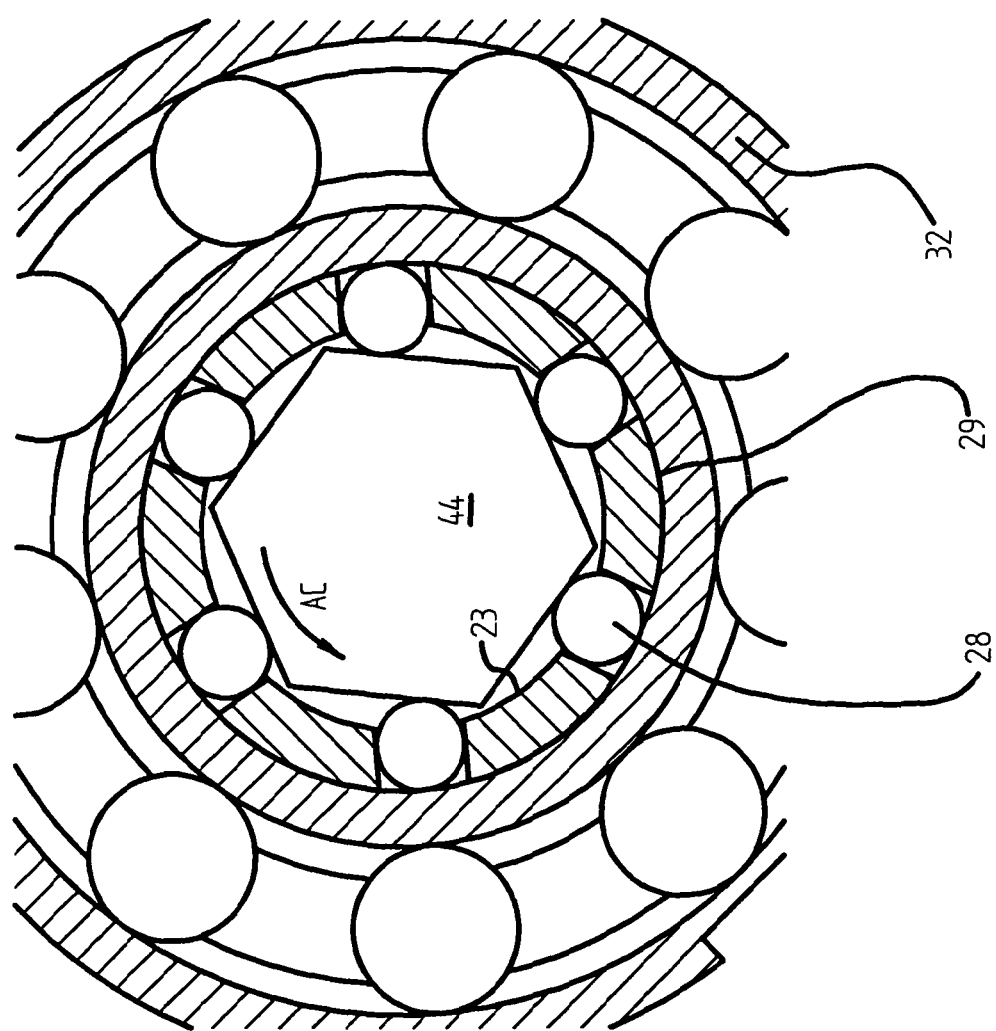

FIG. 5 shows the input tube 29 being driven in the direction AC. This driving forces the rollers 28 onto the flats of the polygon 44 as illustrated. The inner race of the freewheel 32 can move in the anti-clockwise rotational direction (AC) also. Thus, torque from the input tube 29 is transmitted through the cage 23 into the rollers 28, onto the flats of polygon 44 and into the output 40.

Figure 6:
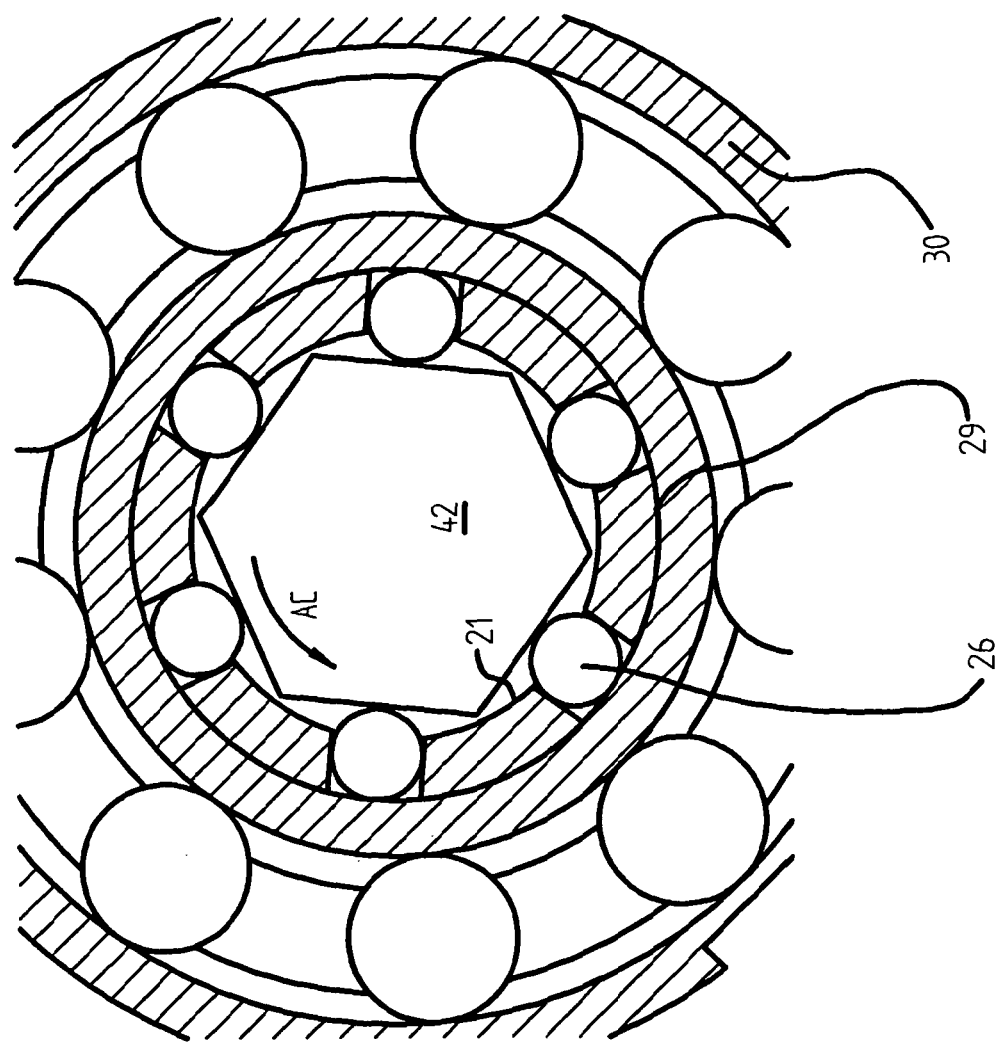

FIG. 6 shows the position of the rollers 26 when the orientation shown in FIG. 5 is obtained. The rollers 26 are free of the inner race of the freewheel 30 and so they do not bind.

FIGS. 3 and 5 illustrate how power can be transmitted from the input 20 to the output 40 in both rotational directions. If torque is applied to the output 40 then, with reference to FIG. 3, torque in the anticlockwise direction will be transmitted through the polygon 42 into the rollers 26 and into the inner race of the freewheel 30. The inner race is unable to travel in the anticlockwise direction. Therefore, torque on the input 40 in the anticlockwise direction is inhibited.

Similarly, with reference to FIG. 5, torque transmitted in the clockwise direction causes rollers 28 to bind on the flats of the polygon 44. The inner race of the freewheel 32 is unable to rotate in the clockwise direction and therefore the back torque in the counter-clockwise direction is inhibited also.

Thus, it can be seen that the coupling described above allows torque to be transmitted in both clockwise and anti-clockwise directions from an input 20 to an output 40, but, torque on the output 40 is reacted in both rotational directions by the freewheels 30 and 32 which are connected to the stationary housing 10.

One embodiment only of the invention has been described above. However, it will be apparent to the skilled addressee that modifications, alterations, omissions and additions are possible within the scope of the invention. For example, freewheels 30 and 32 are trapped bearing type, although trapped rollers could be used or a sprag clutch or the like could be used as a freewheel. In light duty applications the freewheels can be omitted, and static cylinders can replace the freewheels. However, in the driving direction this can lead to wear on such static cylinders because the rollers 26 and 28 will rub on the inner surfaces of these cylinders when driving input is applied in each of the rotational directions.

Hexagonal polygons 42 and 44 have been illustrated and six regularly spaced rollers 26 and 28 have been used. However, the invention need only use one or more flats and bearing elements. The bearing elements need not be rollers. Ball bearings could be employed or other irregular shapes could be used. In order to obtain more power transmission the number of cages could be increased either along the axis A or co-axially. The polygons 42 and 44 described above need not be regular shapes, but could be irregular shapes also. Although the polygons are shown and described as having flats, being flattened or having engagement portions, these portions need not be completely flat or planar, and further non-circular shapes could be used such as curved cam surfaces. Such curved surfaces are described herein as flat or flattened. Such engagement portions need only have a changing radial extent as they are rotated about a fixed point.

In the embodiment shown above the output 40 is shown located within the tube 29 of the input 20 and the freewheels or torque reaction faces are shown radially outwardly of the cages. However, an arrangement whereby the torque reaction face is within the tube 29 and the output is radially outwardly of the cages is possible within the ambit of the invention.

The invention claimed is:

1. An anti back-drive coupling (5) comprising:
   an input (20) driveable about an axis (A) in a clockwise and anticlockwise direction in torque transmitting communication, via a mechanism, with an output (40) driveable about the axis by the input in either of the rotational directions, the mechanism including:
   a tube (29), driveable by the input, carrying two cages (21, 23) spaced along the axis, each cage housing at least one bearing element (26, 28);
   an output member (48) for driving the output, including at least one engagement portion (42, 44) radially adjacent each cage for engagement with the or each bearing element housed in each cage; and
   a torque reaction member (30, 32) engageable with the or each bearing element, for restraining back-torque transmitted through said output member and into the or each bearing element.

2. A coupling as claimed in claim 1, wherein the output member (48) is located radially inward of the cages (21, 23), and said reaction member (30, 32) is located radially outward of the cages.

3. A coupling as claimed in claim 1, wherein the output member (48) is located radially outward of the cages (21, 23), and said reaction member (30, 32) is located radially inward of the cages.

4. A coupling as claimed in claim 1, wherein said reaction member includes a pair of freewheels (30, 32), each allowing rotation in one of the directions only, and arranged in opposition adjacent each said cage (21, 23) such that one of the pair prevents or restrains clockwise rotation, and the other of the pair prevents or restrains anticlockwise rotation, in each case as a result of back torque.

5. A coupling as claimed in claim 1, wherein said at least one bearing element comprises a plurality of bearing elements (26, 28) and each said cage (21, 23) is formed by a plurality of circumferentially spaced apertures in the tube that are open on radially inner and outer surfaces of the tube, each said aperture housing one of said plurality of bearing elements.

6. A coupling as claimed in claim 5, wherein the apertures of a first (21) of the two cages are offset circumferentially from the apertures of a second (23) of the two cages.

7. A coupling as claimed in claim 6, wherein the at least one engagement portion (42, 44) of the output member (48) comprise a plurality of flats (42, 44) adjacent the first cage (21) and a plurality of flats adjacent the second cage (23), each plurality of flats corresponding in number and position to the plurality of apertures in the first and second cages.

8. A coupling as claimed in claim 7, wherein the apertures in each cage (21, 23) are generally equidistant, and the plurality of flats form generally polygonal first and second formations (42, 44) adjacent the first and second cages respectively.

9. A coupling as claimed in claim 8, wherein the apertures of the first and second cages (21, 23) and the flats of the first and second polygonal formations (42, 44) have a circumferential pitch of n degrees and the circumferential offset between the first and second apertures is less than n, and preferably less than ½n.

10. A coupling as claimed in claim 9, wherein, when the input (20) is driven clockwise, the bearing elements in the first cage (21) are driven by the input via the first cage into engagement with the flats of the first polygonal formation (42) while the bearing elements in the second cage (23) are loosely held, and when the input is driven anticlockwise, the bearing elements in the second cage are driven by the input via the second cage into engagement with the flats of the second polygonal formation (44) while the bearing elements in the first cage are loosely held.

11. A coupling as claimed in claim 10, wherein the bearing elements in the first cage (21) when being driven clockwise, engage also with a first of the two freewheels (30) and said first freewheel allows only clockwise rotation of the first cage and associated bearing elements in the first cage engage, and the bearing elements in the second cage (23) when being driven anticlockwise, engage also with a second of the two freewheels (32) associated and said second freewheel allows only anticlockwise rotation of the second cage and associated bearing elements in the first cage engage.

12. A coupling as claimed in claim 8, wherein ends of the bearing element (26, 28) abut portions of the output member (48) upstanding at ends of one of the first or second polygonal formations (42, 44).

13. A coupling as claimed in claim 1, wherein the ratio of rotational speed of the input (20) relative to the output (40) is 1:1.

14. A coupling as claimed in claim 1, wherein each of the two cages (21, 23) includes a respective elongate aperture (22, 24), in use, the at least one bearing member (26, 28) being at least partially housed in one of the apertures.

15. A coupling as claimed in claim 14, wherein lengths of the elongate apertures (22, 24) are greater than a length of the at least one bearing member (26, 28).

16. The coupling of claim 1, wherein the output is driven in the same rotational direction as the input.

17. The coupling of claim 1, wherein the torque reaction member is radially engageable with the or each bearing element.

* * * * *